US011938716B2

(12) United States Patent
Melotti

(10) Patent No.: US 11,938,716 B2
(45) Date of Patent: Mar. 26, 2024

(54) REFRIGERATION UNIT FOR A PRINTING MACHINE AND PRINTING MACHINE

(71) Applicant: BOBST BIELEFELD GMBH, Bielefeld (DE)

(72) Inventor: Renzo Melotti, Sala Monferrato (IT)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 17/633,860

(22) PCT Filed: Jul. 22, 2020

(86) PCT No.: PCT/EP2020/070699
§ 371 (c)(1),
(2) Date: Feb. 8, 2022

(87) PCT Pub. No.: WO2021/028177
PCT Pub. Date: Feb. 18, 2021

(65) Prior Publication Data
US 2022/0396068 A1 Dec. 15, 2022

(30) Foreign Application Priority Data
Aug. 15, 2019 (EP) .................................... 19020477

(51) Int. Cl.
*B41F 23/04* (2006.01)
*B41F 31/00* (2006.01)

(52) U.S. Cl.
CPC ........ *B41F 23/0443* (2013.01); *B41F 31/002* (2013.01)

(58) Field of Classification Search
None
See application file for complete search history.

(56) References Cited

U.S. PATENT DOCUMENTS 8,640,618 B2 * 2/2014 Takahata .............. B41J 11/0024 347/102
2004/0040459 A1 3/2004 Henning et al.
2006/0228128 A1 * 10/2006 Reihl ...................... F25B 27/02 399/94

FOREIGN PATENT DOCUMENTS

CN 101737866 A * 6/2010
CN 102653166 A * 9/2012
CN 103481659 A * 1/2014
(Continued)

OTHER PUBLICATIONS

International Search Report dated Oct. 15, 2020 in International Application No. PCT/EP2020/070699 (3 pages).

*Primary Examiner* — Leslie J Evanisko
(74) *Attorney, Agent, or Firm* — Bookoff McAndrews, PLLC

(57) ABSTRACT

A refrigeration unit (26) for a printing machine is presented. It comprises a dryer interface (28) connectable to a dryer unit (18) of the printing machine in a heat conductive manner and a print interface (30) connectable to a printing unit (14) of the printing machine in a heat conductive manner, wherein the refrigeration unit (26) is adapted to transfer heat (32, 34) from the print interface (30) to the dryer interface (28). Furthermore, a printing machine is described. It comprises a printing unit (14) adapted for printing on a web of carrier material, a dryer unit (18) being adapted for drying printed web of carrier material, and a refrigeration unit (26) as mentioned above.

18 Claims, 3 Drawing Sheets

(56) References Cited

FOREIGN PATENT DOCUMENTS

Figure 1:
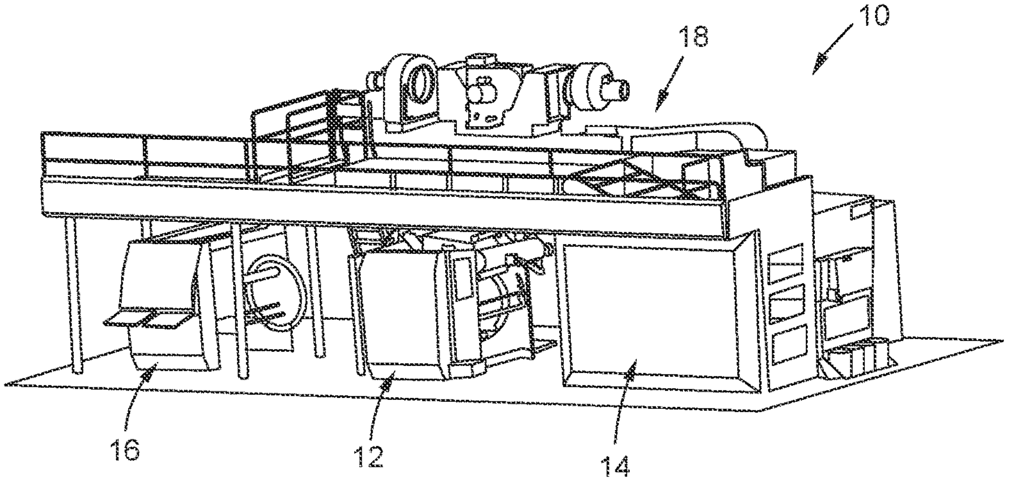

| | | | | |
|---|---|---|---|---|
| DE | 10316860 | A1 * | 10/2004 | .............. B41F 13/22 |
| DE | 102008027473 | A1 | 12/2009 | |
| WO | 2009059787 | A2 | 5/2009 | |

* cited by examiner

REFRIGERATION UNIT FOR A PRINTING MACHINE AND PRINTING MACHINE

CROSS-REFERENCE TO RELATED APPLICATION(S)

This application is a National Stage under 35 U.S.C. § 371 of International Application No. PCT/EP2020/070699, filed Jul. 22, 2020, which claims priority to European Patent Application No. 19020477.6, filed Aug. 15, 2019, the entireties of which are incorporated herein by reference.

BACKGROUND OF THE INVENTION

The invention relates to a refrigeration unit for a printing machine, especially for a flexographic printing machine.

Furthermore, the invention relates to a printing machine, especially a flexographic printing machine.

Printing machines, especially flexographic printing machines, and refrigeration units to be used in connection with such machines are known in the art.

In this context a flexographic printing machine is a printing machine which uses the principle of flexography for printing on a substrate or support material. The key element of such a machine is a rubber or polymer plate on which a positive mirrored master of the required image is provided as a 3D relief. The image areas are raised with respect to the non-image areas on the rubber or polymer plate. The plate is mounted on a so-called plate cylinder.

In a first step of the flexographic printing process ink is transferred from an ink reservoir to the so-called anilox roller or ceramic roller whose texture can absorb a specific amount of ink. The anilox roller then applies the ink to the printing plate in a uniform thickness. The actual printing process takes place with the substrate being held between the printing plate and the impression cylinder. In this situation the image is transferred from the printing plate to the substrate.

In order to avoid an excessive amount of ink on the anilox roller a scraper or doctor blade may be used in order to remove excessive ink from the anilox roller before inking the printing plate.

Flexographic printing machines are widely used for printing on almost any type of substrate, e.g. plastics, metal, and paper. It is especially common in the packaging industry. Very often the terms “flexography” or “flexographic” are abbreviated to “flexo”.

In known flexographic printing machines the impression drum, which may also be termed a central impression drum, is connected to a refrigeration unit in order to cool the impression drum and the substrate supported thereon. To this end heat is transferred from the impression drum to an outdoor heat exchanger via a water circuit. In other words, the impression drum is heat conductively connected to a water circuit, which absorbs heat in the area of the impression drum and releases the heat to an outdoor environment. Usually, an outdoor heat exchanger or refrigeration unit is used in order to avoid overheating of the room where the flexographic printing machine is located.

Additionally, the web of substrate or support material has to be cooled after is has travelled through the main dryer of the printing machine. Consequently, another refrigeration unit is placed after the main dryer, when regarded in the direction of travel of the web of substrate or support material. This refrigeration unit is also connected to an outdoor heat exchanger or outdoor refrigeration unit via a water circuit. The outdoor heat exchanger or refrigeration unit for cooling the central impression drum and the outdoor heat exchanger or refrigeration unit for cooling the web of substrate may be the same.

It is an objective of the present invention to improve refrigeration units of known printing machines. In this context, refrigeration units shall especially be simple to install and efficient in operation.

BRIEF SUMMARY OF THE INVENTION

The above problem is solved by a refrigeration unit for a printing machine, especially for a flexographic printing machine, comprising a dryer interface connectable to a dryer unit of the printing machine in a heat conductive manner and a print interface connectable to a printing unit of the printing machine in a heat conductive manner, wherein the refrigeration unit is adapted to transfer heat from the print interface to the dryer interface. This means that the heat to be led away from the printing unit is used as process heat in a dryer unit. This makes the refrigeration unit more efficient both in terms of energy consumption and in terms of costs. Additionally, compared to known refrigeration units the outdoor heat exchanger and the corresponding tubing may be eliminated.

The basic idea of the invention, thus, is to make effective use of the excessive heat, which needs to be eliminated from the printing unit or printing press. Consequently, the overall energy consumption of a flexographic printing machine equipped with a refrigeration unit according to the invention may be reduced. The excessive heat is used internally in the printing machine.

Preferably, the refrigeration unit comprises a coolant circuit having a first coolant circuit portion being attributed to the print interface and being positionable in the printing unit or adjacent to the printing unit, wherein the first coolant circuit portion is adapted for absorbing heat originating from the printing unit, and having a second coolant circuit portion being attributed to the dryer interface and being positionable in the dryer unit or adjacent to the dryer unit, wherein the second coolant circuit portion is adapted for delivering heat to the dryer unit. In this context, the first coolant portion is preferably positioned above the printing unit. The use of a coolant circuit makes the heat transfer from the printing unit to the dryer unit both reliable and efficient. Moreover, the dimensioning of the coolant circuit may be adapted to the amount of heat to be transferred. Consequently, sufficient cooling of the printing unit is ensured. Furthermore, a coolant circuit may be easily adapted to available installation space and is relatively compact.

According to an embodiment of the refrigeration unit, the first coolant circuit portion comprises an evaporator adapted to evaporate coolant, and the second coolant circuit portion comprises a condenser adapted to condense coolant, wherein the coolant circuit further comprises a compressor being positioned between the first coolant circuit portion and the second coolant circuit portion, when regarded in the sense of coolant flow, and wherein the coolant circuit additionally comprises an expansion valve being positioned between the second coolant circuit portion and the first coolant circuit portion, when regarded in the sense of coolant flow. Consequently, the refrigeration unit operates on the principle known from refrigerators used for food in kitchen. Such coolant circuits are able to reliably transfer relatively high amounts of heat and are compact in design. Furthermore, they have a low energy consumption.

Advantageously, the refrigeration unit comprises at least one ventilation unit positioned adjacent to the second coolant circuit portion, wherein the ventilation unit is adapted to create an air flow in the area of the second coolant circuit portion. The air flow may be connected to the air flow used in a dryer unit. Alternatively, the air flow created in the refrigeration unit may be the same air flow as is used for drying. The ventilation unit creates a so-called forced convection, which increases the heat transfer from the second coolant circuit portion to the air surrounding it. Consequently, the heat transfer capacity of the refrigeration unit is increased.

Furthermore, the problem is solved by a printing machine, especially a flexographic printing machine, comprising a printing unit adapted for printing on a web of carrier material, a dryer unit being adapted for drying printed web of carrier material, and a refrigeration unit according to the invention, wherein the refrigeration unit is heat conductively connected to the dryer unit via the dryer interface, and wherein the refrigeration unit is heat conductively connected to the printing unit via the print interface. Consequently, the heat to be led away from the printing unit is kept internal to the printing machine and is provided to the dryer unit where it is used for drying the printed web. As a result thereof, the printing machines operates in an energy efficient and cost efficient manner. Furthermore, an outdoor heat exchanger and the corresponding tubing is not necessary any more.

In this context, the carrier material may be any material suitable as a substrate for flexographic printing machines, e.g. paper, cardboard, plastics, metal.

In an alternative, the first coolant circuit portion is at least partially located inside a printing drum or adjacent to the printing drum. In this context "at least partially" is to be understood in that at least a portion of the coolant circuit is located inside the printing drum. Consequently, the excessive heat on the printing drum may be led away in an efficient and reliable manner.

The dryer unit may comprise a main dryer adapted for drying printed web of carrier material after the application of one or more inks of different colors. Thus, a main dryer is a dryer which dries the web after inks of all relevant colors have been applied thereto. Such a dryer is positioned after the printing unit, when regarded in the moving direction of the web.

Additionally or alternatively, the dryer unit may comprise an intracolor dryer adapted for drying printed web of carrier material between the application of inks of different colors. Intracolor dryers usually are provided between the different ink application units of a printing unit. They serve the purpose of drying ink of one color before ink of another color is applied to the web.

According to an embodiment, the dryer unit comprises a central ventilation system, wherein the heat from the printing unit is transferred to the central ventilation system. The central ventilation system may supply different kinds of dryers with warm air. For example, one or more intracolor dryers and one or more main dryers may be supplied with air by the central ventilation system.

Preferably, the refrigeration unit is connected to the dryer unit via an air conduit. The air conduit may also be designated a tunnel.

Figure 2:
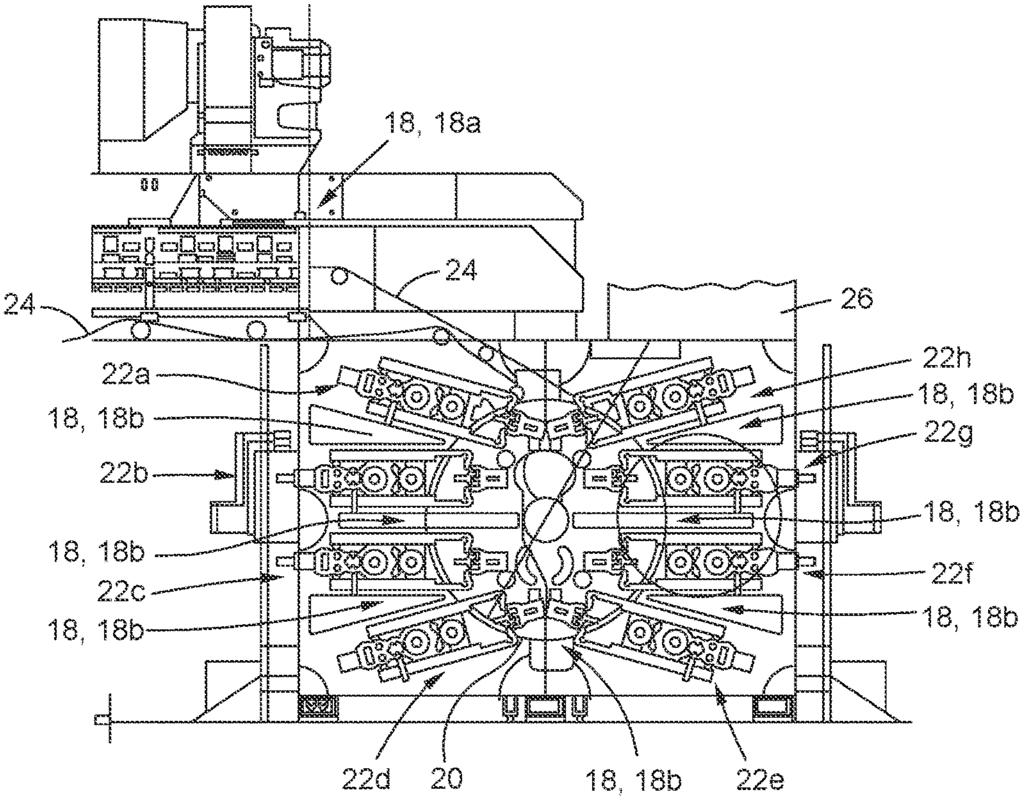
Figure 3:
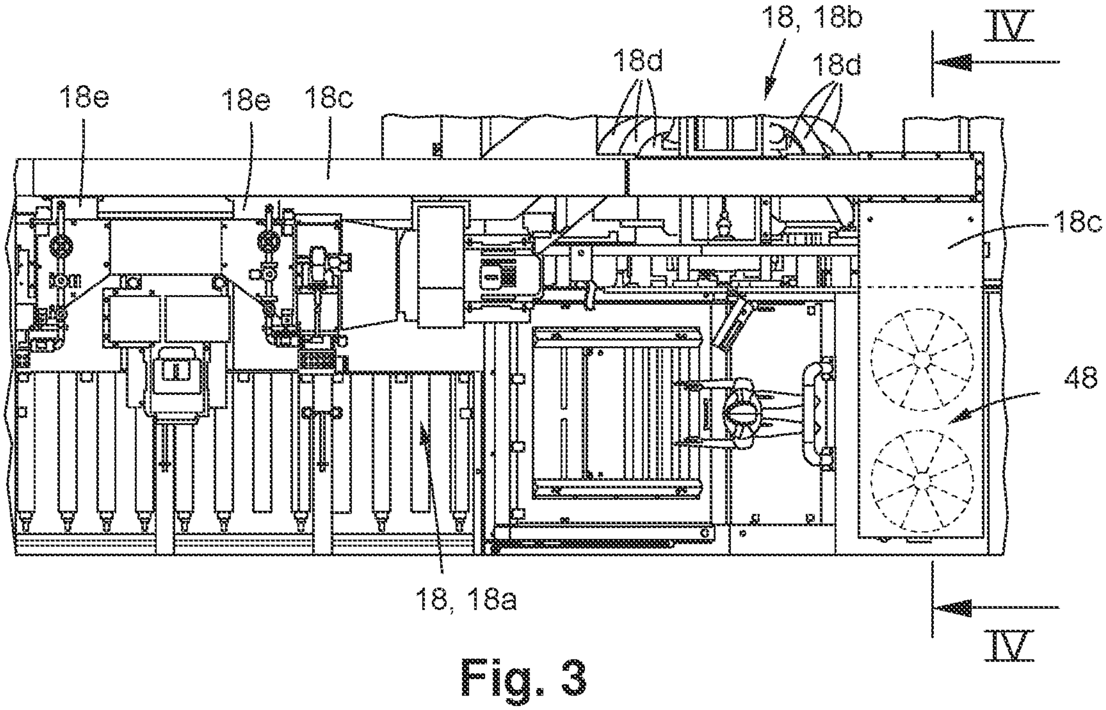
Figure 4:
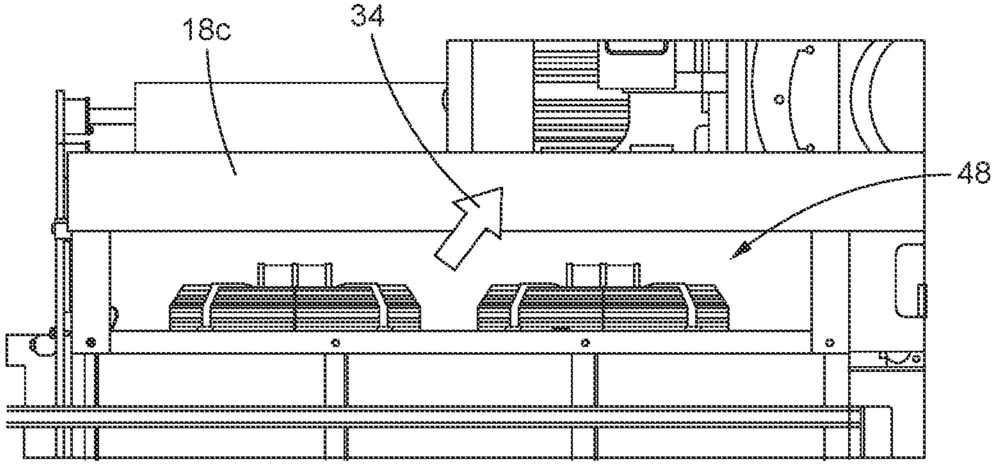
Figure 5:
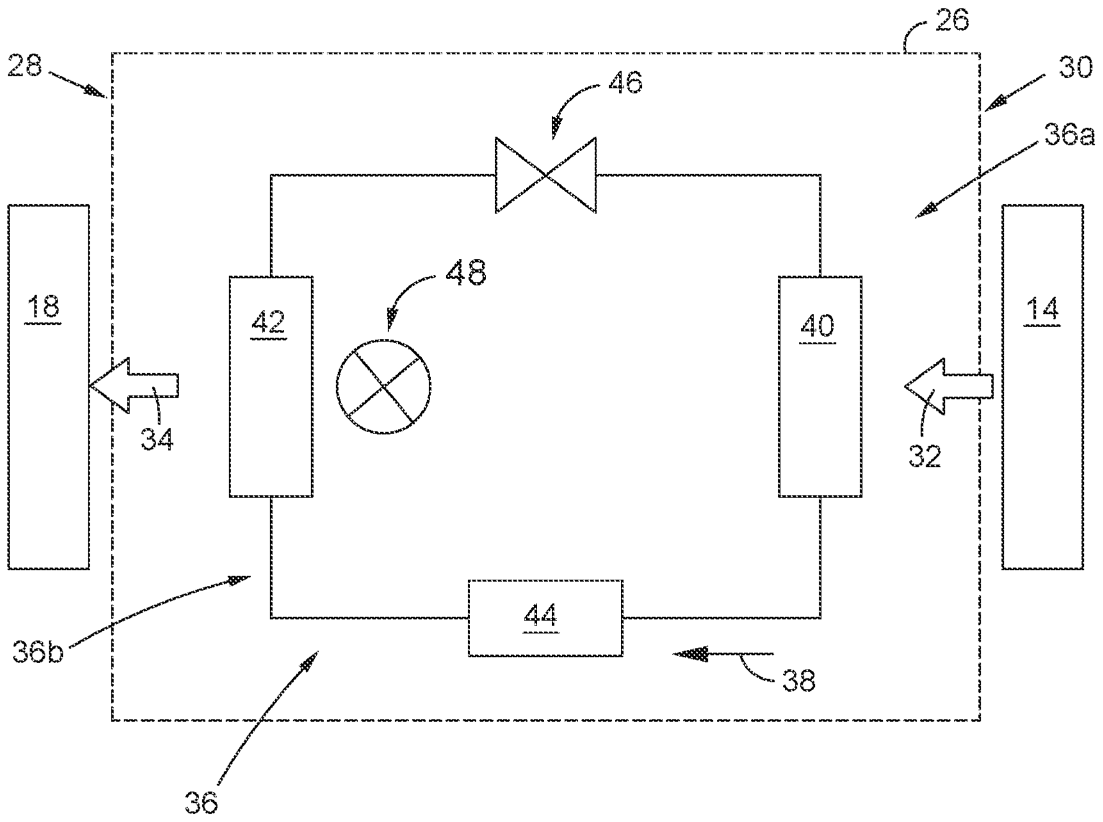

The invention will now be explained with reference to an embodiment which is shown in the attached drawings. In the drawings, FIG. 1 shows a flexographic printing machine according to the invention comprising a refrigeration unit according to the invention, FIG. 2 shows a partial schematic sectional view of the flexographic printing machine of FIG. 1, FIG. 3 shows a view of the flexographic printing machine of FIG. 1 along direction III, FIG. 4 shows a partial sectional view IV-IV of the flexographic printing machine of FIG. 3, and FIG. 5 schematically shows the functional principle of the refrigeration unit according to the invention.

DETAILED DESCRIPTION

FIG. 1 shows a printing machine 10, which is a flexographic printing machine in the examples shown.

It comprises a web feeding unit 12, where a web of carrier material may be stored before the printing process takes place, a printing unit 14 adapted for printing on the web of carrier material, and a storage unit 16, where printed web is stored after the printing process.

The printing machine 10 also has a dryer unit 18, which comprises a main dryer 18*a* adapted for drying printed web of carrier material after the printing process.

Details of the printing unit 14 may be seen in FIG. 2.

As a central element the printing unit 14 comprises a central impression drum 20, which is coupled to eight ink application units 22*a*, 22*b*, 22*c*, 22*d*, 22*e*, 22*f*, 22*g*, 22*h*, each of which is adapted to apply an ink of a different color to the web 24. Consequently, the flexographic printing machine 10 may be termed an eight color printing machine.

Between each of the ink application units 22*a* and 22*b*, 22*b* and 22*c*, 22*c* and 22*d*, 22*d* and 22*e*, 22*e* and 22*f*, 22*f* and 22*g* and 22*g* and 22*h* a so-called intracolor dryer 18*b* is provided, which is part of the dryer unit 18. These intracolor dryers 18*b* are adapted for drying printed web of carrier material between the application of inks of different colors.

In other words, the ink applied to the web 24 by the ink application unit 22*a* is dried by an intracolor dryer 18*b* before ink of a different color is applied to the web 24 by the ink application unit 22*b* and so on.

The flexographic printing machine 10 also comprises a refrigeration unit 26 which is heat conductively connected to the dryer unit 18 via a dryer interface 28, and which is heat conductively connected to the printing unit 14 via a print interface (cf. FIG. 5).

The refrigeration unit 26 is adapted to transfer heat from the print interface 30 to the dryer interface 28. In other words, the refrigeration unit 26 is adapted to extract heat from the printing unit 14, i.e. it is adapted to cool the printing unit 14, and supply the heat to the dryer unit 18, where it is used as process heat.

In FIG. 5 the heat being extracted from the printing unit 14 is illustrated by arrow 32 and the heat being supplied to the dryer unit 18 is illustrated by arrow 34.

In order to do so, the refrigeration unit 26 comprises a coolant circuit 36, wherein a flow direction of coolant is indicated by arrow 38.

The coolant circuit 36 has a first coolant circuit portion 36*a* which is attributed to the print interface 30 and comprises an evaporator 40 adapted to evaporate the coolant.

The first coolant circuit portion 36*a* is positioned adjacent to the printing unit 14. Alternatively, the first coolant circuit portion 36*a* is at least partially located inside the printing drum 20 or adjacent to the printing drum 20.

Consequently, the first coolant circuit portion 36*a* is adapted for absorbing heat 32 originating from the printing unit 14 and uses this heat 32 for evaporating the coolant.

The coolant circuit 36 also has a second coolant circuit portion 36*b* which is attributed to the dryer interface 28 and comprises a condenser 42 adapted to condense coolant.

The second coolant circuit portion **36*b* is positioned adjacent to the dryer unit 18**.

Consequently, the second coolant circuit portion **36*b* is adapted for delivering heat 34 to the dryer unit 18** by condensing coolant.

The coolant circuit is completed by a compressor 44 being positioned between the first coolant circuit portion **36*a* and the second coolant circuit portion 36*b*, when regarded in the sense of coolant flow 38. In the example shown the compressor 44 is interposed between the evaporator 40 and the condenser 42**.

Moreover, the coolant circuit 36 comprises an expansion valve 46 being positioned between the second coolant circuit portion **36*b* and the first coolant circuit portion 36*a*, when regarded in the sense of coolant flow 38**.

Additionally, the refrigeration unit 26 comprises a ventilation unit 48 positioned adjacent to the second coolant circuit portion **36*b*. The ventilation unit 48 is adapted to create an air flow in the area of the second coolant circuit portion 36*b*, which enhances heat transfer from the coolant to the dryer unit 18**.

The air flow created by the ventilation unit 48 may be directly fed to the dryer unit 18.

In this context, the dryer unit 18 may also comprise a central ventilation system **18*c*, wherein the heat 34 originating from the printing unit 14 is transferred to the central ventilation system 18*c***.

The ventilation system **18*c* may supply the intracolor dryers 18*b* with heated air via conduits 18*d* and the main dryer 18*a* via conduits 18*e***.

The coolant circuit 36 may use a hydrocarbon coolant, e.g. propane or butane.

The refrigeration unit 26 operates as follows.

Coolant is evaporated in the evaporator 40 by heat 32 originating from the printing unit 14.

Subsequently, gasified coolant is fed to the condenser 42 via the compressor 44, where it is condensed, i.e. the coolant is liquefied. The heat 34 resulting from the condensation process is fed to the dryer unit, especially to a central ventilation system **18*c* thereof. This process is assisted by the ventilation unit 48**.

After that, the coolant flows back to the evaporator 40 via the expansion valve 46.

In the example shown approximately 15 kW of heat are transferred from the printing unit 14 to the dryer unit 18.

The invention claimed is:

1. A printing machine comprising:
- a printing unit adapted for printing on a web of carrier material, the printing unit including a printing drum;
- a dryer unit adapted for drying the web of carrier material; and
- a refrigeration unit comprising:
  - a coolant circuit having:
    - a first coolant circuit portion at least partially located inside the printing drum of the printing unit, wherein the first coolant circuit portion is adapted for absorbing heat originating from the printing drum of the printing unit, and
    - a second coolant circuit portion positioned in the dryer unit or adjacent to the dryer unit, wherein the second coolant circuit portion is adapted for delivering heat to the dryer unit,
  - wherein the refrigeration unit is adapted to transfer heat from the first coolant circuit portion adapted for absorbing heat originating from the printing drum to the second coolant circuit portion adapted for delivering heat to the dryer unit.

2. The printing machine according to claim 1, wherein:
- the first coolant circuit portion comprises an evaporator adapted to evaporate coolant,
- the second coolant circuit portion comprises a condenser adapted to condense coolant,
- the coolant circuit further comprises a compressor being positioned between the first coolant circuit portion and the second coolant circuit portion, when regarded in the sense of coolant flow, and
- the coolant circuit further comprises an expansion valve being positioned between the second coolant circuit portion and the first coolant circuit portion, when regarded in the sense of coolant flow.

3. The printing machine according to claim 1, wherein the refrigeration unit comprises at least one ventilation unit positioned adjacent to the second coolant circuit portion, wherein the at least one ventilation unit is adapted to create an air flow in the area of the second coolant circuit portion.

4. The printing machine according to claim 1,
- wherein the second coolant circuit portion of the refrigeration unit is heat conductively connected to the dryer unit via a dryer interface, and
- wherein the first coolant circuit portion of the refrigeration unit is heat conductively connected to the printing unit via a print interface.

5. The printing machine according to claim 1, wherein the dryer unit comprises a main dryer adapted for drying printed web of carrier material after the application of one or more inks of different colors.

6. The printing machine according to claim 1, wherein the dryer unit comprises an intracolor dryer adapted for drying printed web of carrier material between the application of inks of different colors.

7. The printing machine according to claim 1, wherein the dryer unit comprises a central ventilation system, wherein the heat from the printing unit is transferred to the central ventilation system.

8. The printing machine according to claim 1, wherein the refrigeration unit is connected to the dryer unit via an air conduit.

9. A printing machine comprising:
- a refrigeration unit comprising:
  - a coolant;
  - a first coolant portion at least partially inside a printing drum of a printing unit of the printing machine to transfer heat into the coolant from the printing drum of the printing unit of the printing machine; and
  - a second coolant portion to deliver the transferred heat, from the printing drum of the printing unit by the first coolant portion, in the coolant to a dryer unit of the printing machine.

10. The printing machine of claim 9, wherein the first coolant portion includes an evaporator to evaporate the coolant using the transferred heat from the printing unit of the printing machine.

11. The printing machine of claim 9, wherein the second coolant portion includes a condenser to condense the coolant by delivering the transferred heat in the coolant, from the printing unit by the first coolant portion, to the dryer unit of the printing machine.

12. The printing machine of claim 11, wherein the condenser includes a ventilation unit to create an air flow for the second coolant portion to heat air using the transferred heat in the coolant and deliver the heated air to the dryer unit of the printing machine.

13. The printing machine of claim 9, further comprising:

a compressor to condense the coolant in a flow of the coolant from the first coolant portion to the second coolant portion.

14. A printing machine comprising:

a printing unit including a printing drum; and a refrigeration unit comprising:

an evaporator for a printing unit of the printing machine, the evaporator to absorb heat from at least a portion of the refrigeration unit inside the printing drum of the printing unit to cool the printing drum of the printing unit; and a condenser for a dryer unit of the printing machine, the condenser to deliver the absorbed heat from the printing drum of the printing unit to the dryer unit.

15. The printing machine of claim 14, wherein the evaporator and condenser include a coolant circulating from the condenser to the evaporator to absorb the heat from the printing unit to cool the printing unit, and from the evaporator to the condenser to deliver the absorbed heat from the printing unit to the dryer unit.

16. The printing machine of claim 15, further comprising:

a compressor to compress the coolant circulating from the evaporator to the condenser.

17. The printing machine of claim 15, further comprising:

an expansion valve to expand the coolant circulating from the condenser to the evaporator.

18. The printing machine of claim 14, wherein the condenser includes a ventilation unit to create an air flow for the condenser to heat air using the absorbed heat from the printing unit and deliver the heated air to the dryer unit of the printing machine.

* * * * *